US007028089B2

(12) United States Patent
Agarwalla et al.

(10) Patent No.: US 7,028,089 B2
(45) Date of Patent: Apr. 11, 2006

(54) METHOD AND APPARATUS FOR CACHING SUBSCRIBED AND NON-SUBSCRIBED CONTENT IN A NETWORK DATA PROCESSING SYSTEM

(75) Inventors: Rajesh Agarwalla, Pittsburgh, PA (US); Thirumale Niranjan, Pittsburgh, PA (US); Srikanth Ramamurthy, Pittsburgh, PA (US); Sumanthkumar Sukumar, San Francisco, CA (US); Yi Zhou, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/960,448

(22) Filed: Sep. 21, 2001

(65) Prior Publication Data

US 2003/0061372 A1 Mar. 27, 2003

(51) Int. Cl.
*G06F 15/16* (2006.01)

(52) U.S. Cl. ....................... 709/229; 709/203; 709/219

(58) Field of Classification Search ................ 709/213, 709/216–219, 201–203, 223–229; 713/201; 711/118, 126
See application file for complete search history.

(56) References Cited

U.S. PATENT DOCUMENTS

| | | | | |
|---|---|---|---|---|
| 6,553,409 | B1 * | 4/2003 | Zhang et al. | 709/213 |
| 6,728,885 | B1 * | 4/2004 | Taylor et al. | 713/201 |
| 6,760,756 | B1 * | 7/2004 | Davis et al. | 709/215 |
| 6,792,507 | B1 * | 9/2004 | Chiou et al. | 711/119 |
| 6,868,448 | B1 | 3/2005 | Gupta et al. | 709/226 |
| 6,871,213 | B1 | 3/2005 | Graham et al. | 709/205 |

* cited by examiner

*Primary Examiner*—Dung C. Dinh
*Assistant Examiner*—Victor Lesniewski

(57) ABSTRACT

A method, apparatus, and computer implemented instructions for managing data in a network data processing system. A packet containing data associated with content is received. A determination is made as to whether the packet is enabled for content distribution by examining the data packet. Responsive to the packet being enabled for content distribution, the content is distributed in response to a request for the content without requiring a validity check. If the packet is not enabled for content distribution, a validity check is performed on the content using control information contained within the header of the data packet.

17 Claims, 3 Drawing Sheets

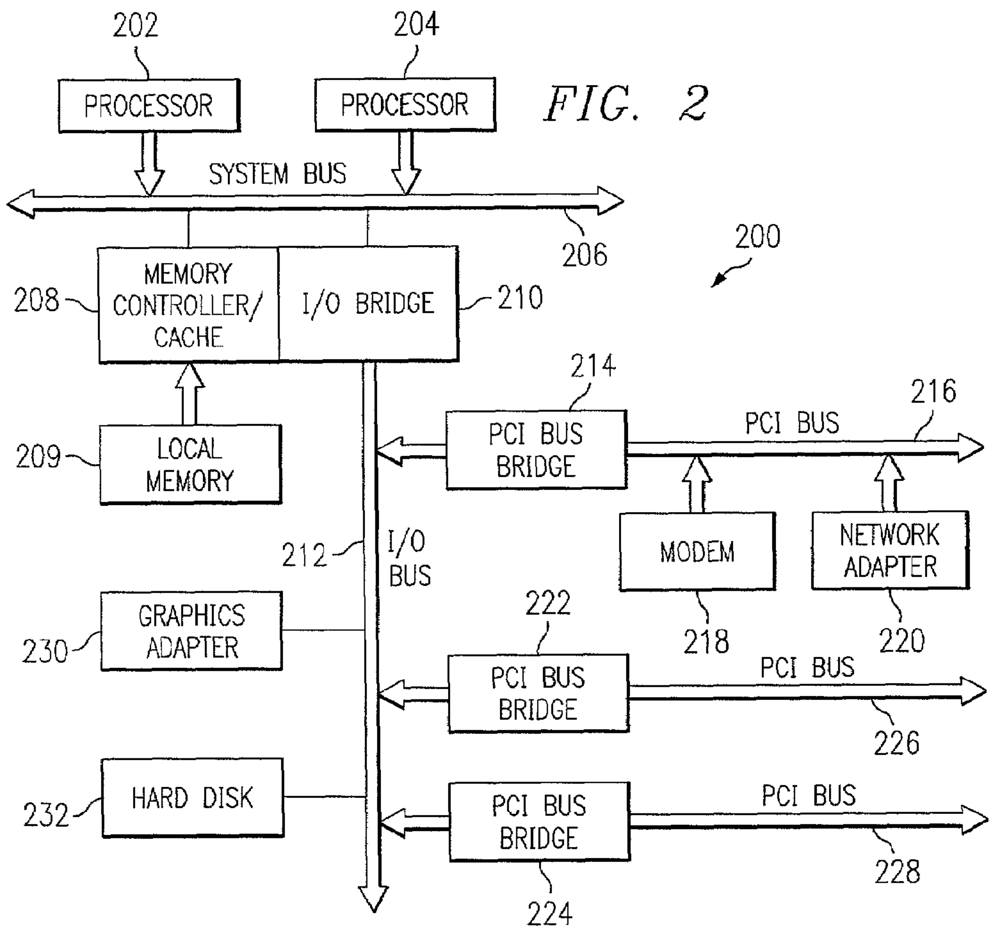
*FIG. 2*
*FIG. 3*
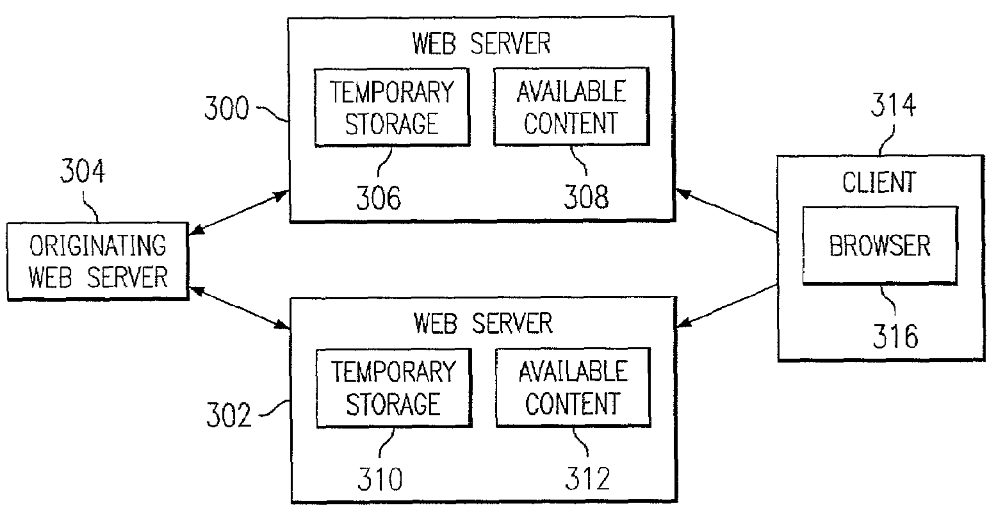

METHOD AND APPARATUS FOR CACHING SUBSCRIBED AND NON-SUBSCRIBED CONTENT IN A NETWORK DATA PROCESSING SYSTEM

CROSS REFERENCE TO RELATED APPLICATIONS

The present invention is related to an application entitled Method and Apparatus for Minimizing Inconsistency Between Data Sources in a Web Content Distribution System, Ser. No. 09/960,451, issued as U.S. Pat. No. 6,938,072, filed even date hereof, assigned to the same assignee, and incorporated herein by reference.

FIELD OF THE INVENTION

The present invention relates generally to an improved data processing system, in particular to a method and apparatus for processing data. Still more particularly, the present invention provides a method, apparatus, and computer implemented instructions for caching subscribed and non-subscribed web content in a network data processing system.

BACKGROUND OF THE INVENTION

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Content distribution systems are employed by businesses and entities delivering content, such as Web pages or files to users on the Internet. Currently, content providers will set up elaborate server systems or other types of data sources to provide content to various users. Web content distribution systems are those systems that are employed to distribute content to these servers and caches. This type of setup includes various nodes that act as sources of data. In this type of content distribution scheme, data from a primary or publishing node is propagated to all of the other nodes in the system. These types of systems cache or hold content for distribution to requesters at clients, such as personal computers and personal digital assistants. Different mechanisms are employed to determine whether the content cached at the node is current and whether this content should be distributed. Currently, content providers are required to use content distribution systems in which the same type of mechanism is used to determine whether the content is current. Additionally, if a content provider sends content to a non-content distribution capable system, the content is formatted in a manner differently than in those for content distribution capable systems.

Therefore, it would be advantageous to have an improved method, apparatus, and computer-implemented instructions for caching content in a node.

SUMMARY OF THE INVENTION

The present invention provides a method, apparatus, and computer implemented instructions for managing data in a network data processing system. A packet containing data associated with content is received. A determination is made as to whether the packet is enabled for content distribution by examining the data packet. Responsive to the packet being enabled for content distribution, the content is distributed in response to a request for the content without requiring a validity check. If the packet is not enabled for content distribution, a validity check is performed on the content using control information contained within the header of the data packet.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of a data processing system that may be implemented as a server in accordance with a preferred embodiment of the present invention;

FIG. 3 is a diagram illustrating data flow in updating content at data sources in accordance with a preferred embodiment of the present invention;

DETAILED DESCRIPTION OF THE PREFERRED EMBODIMENT

Figure 1:
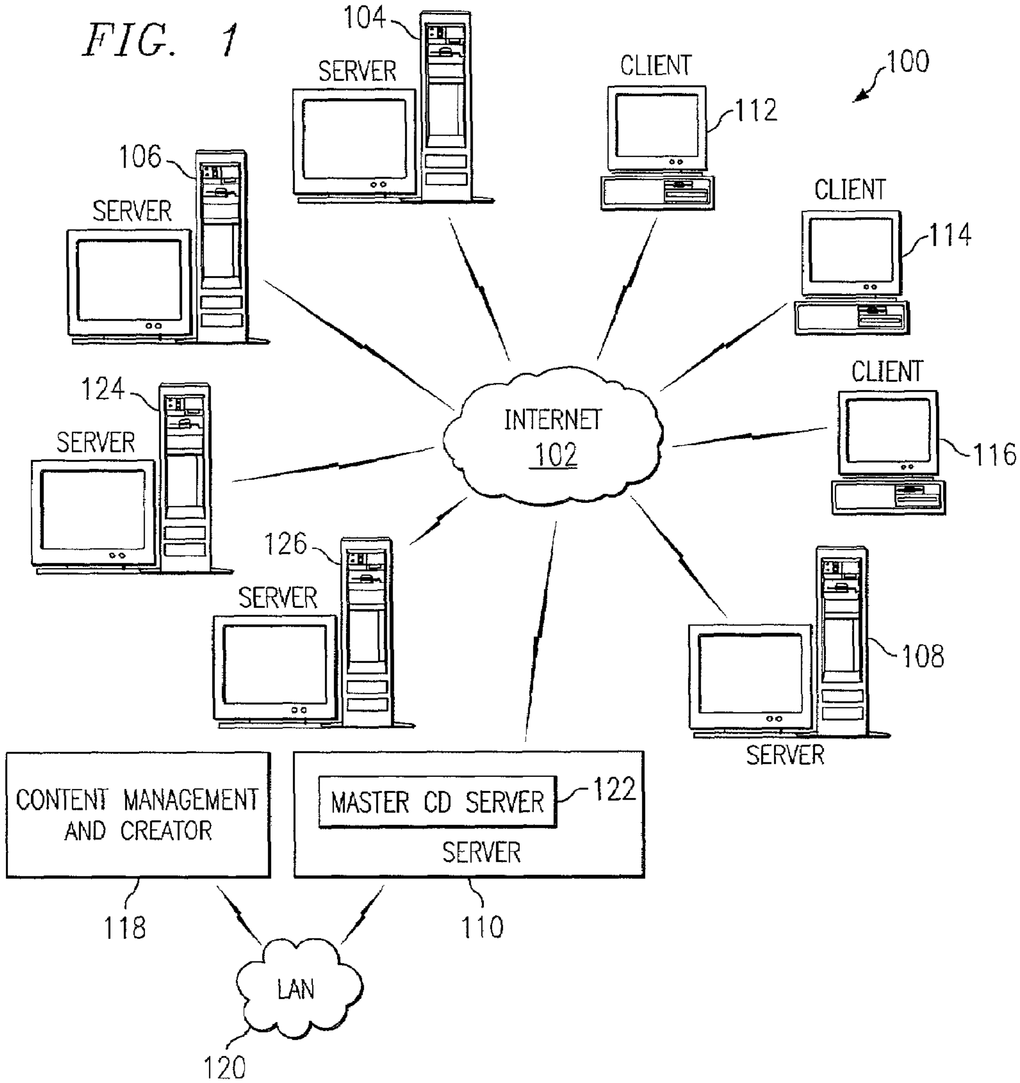
FIG. 1 is a network data processing system in accordance with a preferred embodiment of the present invention.

With reference now to the figures and in particular to FIG. 1, a network data processing system is depicted in accordance with a preferred embodiment of the present invention. Network data processing system 100 in this example includes network 102, which interconnects servers 104, 106, 108, 110, 124, and 126. These servers provide content to clients, such as clients 112, 114, and 116, through network 102. In this example, network 102 takes the form of the Internet.

Servers 104–110 are servers within a Web content distribution system. This system also includes content management and creator 118, which is connected to server 110 by local area network (LAN) 120. This Web content distribution system is also referred to as a content distribution framework and is an example of a system in which inconsistency between data and data sources is minimized, such as servers 104–108. In this example, server 110 functions as a primary publishing node while servers 104–108 serve as data sources to provide content to users making requests. Server 110 includes a master content distribution server and a master content distribution (CD) server process 122.

Master content distribution server process 122 accepts notifications of new, deleted, or modified content from content management and creator 118. These notifications are propagated to servers 104–108, which then can invalidate or pull updated content from various sources. The content may be pulled from server 110 or from other sources. Typically, when a content publisher issues a notification to master CD server 122 in server 110, an identification of a staging server containing the content is made. Each of the servers pulling content includes a content distribution process (not shown), which will update content on a server when a notification is received.

In these examples, the servers act as content distribution capable caches. CD-capable caches subscribe to content from specific providers that are equipped with the capability to issue notifications; this subscription mechanism could be enhanced with "content groups", where a certain set of content is tagged as belonging to a content group. These tags may be provided by the content creator, or inferred based on regular expression matching on the URL (e.g., SPORTS content group could be defined as all URLs that match www.espn.com/mlb/*, www.espn.com/nba/*, www.espn.com/nfl/*, www.espn.com/nhl/*, and www.espn.com/sports/headlines/*.html)

This framework may be used to distribute multiple content types. For example, the framework may be used to move static content. Additionally, the framework may be used to publish or present documents on Web sites. In this instance, the framework will send notifications to the various nodes from the publishing node. The framework takes up the responsibility of updating the various repositories. Next, the framework may be used to move applications to the nodes for distribution and use. Third, the framework may be used to manage cached dynamic content. Finally, the framework may be used to distribute media files. Media files are similar to static pages. However, their large size requires a slightly different treatment. The transport mechanism in the framework may include mechanisms to pace the data distribution depending on factors such as the media type, the bandwidth requirements, and available bandwidth.

Network data processing system 100 includes servers, which may be either content distribution capable or content distribution incapable. For example, server 124 and server 126 are content incapable servers in these examples. In other words, notifications sent out to network 102 cannot be used by these servers to receive notifications that the content has been updated or to pull updated content in response to the notifications.

These providers should also expect that their data may be cached at both CD-capable and CD-incapable caches, such as those described above. One problem, from the Web server perspective, is to define a protocol such that correct behavior is seen at both kinds of caches, with minimal work by a content provider. At a CD-capable cache, content from CD-capable providers as well as content from CD-incapable providers co-exists. The challenge, from a caching perspective, is to devise cacheability criteria that works efficiently for content (from CD-capable providers) that this cache has subscribed to, and that works correctly for content that this cache has not subscribed to and for content from CD-incapable providers.

In solving the problem with caching content at both content capable and content incapable caches, the present invention provides a method, apparatus, and computer implemented instructions for caching or storing content in nodes in a network data processing system in a manner that works correctly for subscribed content in a cache, non-subscribed content in a cache, and for content distribution incapable providers. The mechanism of the present invention employs headers and cache control extensions to provide an ability to handle data at both content distribution capable and content distribution incapable caches. In these examples, the headers are implemented as HTTP 1.1 headers.

When a CD-capable (provider) server sends back a response to a requester (which could be an intermediary proxy cache or a browser), this server will add a new extension to the cache control header that says that the content that it is sending out is "CD-capable". If the intermediary is a CD-capable proxy cache, the intermediary will check if that specific page is being subscribed to at this node. If so, the intermediary will cache the page along with the extension header. If the intermediary does not subscribe to the page, it will delete the extension header and then cache the content.

When a subsequent request for the same page arrives at the cache, the cache will look at the cache-control headers and perform a validity check by determining if the factors indicate that the item is valid. These factors may be, for example, max-age, must-revalidate, proxy-revalidate, no-cache, or an Expires header. Since the cache is a CD-capable cache and the item is a CD-capable item, the cache can override these standard HTTP 1.1 cache-control headers and the Expires header and declare that the page is valid and send it out from the cache. The standard cache-control headers specified at the server ensure that the caching behavior at CD-incapable caches will be correct. But since CD-capable caches are equipped to receive notifications for subscribed data, they can choose to ignore the cache-control headers and Expires header and pass the page on to the requester.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

With reference now to FIG. 3, a diagram illustrating data flow in updating content at data sources is depicted in accordance with a preferred embodiment of the present invention. In this example, content at Web server 300 and Web server 302 is updated from content located at originating Web server 304. These servers are servers in a Web content distribution system such as that illustrated in FIG. 1. Web server 300 includes temporary storage 306 and available content 308. Similarly, Web server 302 includes temporary storage 310 and available content 312.

When a user requests content from a client, such as client 314, the request is typically made from a browser, such as browser 316. The request may be routed to either Web server 300 or Web server 302 through a load balancing system. If Web server 300 receives the request, the content returned to client 314 is returned from content in available content 308. This content may be, for example, a Web page or an audio file. If the request is routed to Web server 302, the content is returned to client 314 from content in available content 312. In either case, the content is identical.

At some point, changes to the content in available content 308 and available content 312 may be made. For example, a new Web page may be added, a Web page may be modified, or a Web page may be deleted from the content. The initiation of this process occurs when a signal indicating that content is to be updated is received by Web server 300 and Web server 302. This signal is received from originating Web server 304 in this example. In these examples, Web server 300 and Web server 302 pull the content from originating Web server 304. The content is stored in temporary storage 306 and temporary storage 310 during the pull process. When Web server 300 receives all of the new content, this Web server sends an acknowledgment signal back to originating Web server 304. Similarly, Web server 302 will transmit an acknowledgment signal to originating Web server 304 when Web server 302 has pulled all of the new content. The completion of the pulling of new content may occur at different times in Web server 300 and Web server 302 depending on the various network conditions, such as available bandwidth, network traffic, and the number of hops to originating Web server 304.

This content is not made available to clients until a second signal is received from originating Web server 304 indicating that the content is to be published or made available in response to request from clients. During this time, the content in available content 308 and available content 312 is used to reply to requests from clients.

In addition, Web server 300 and Web server 302 both validate content for distribution based on notifications from a server, such as originating Web server 304. In these examples, content received from originating Web server 304 by Web server 300 for Web server 302 includes an indicator, such as an extension to the cache control header, to identify the content as being content distribution capable. These Web servers check the extension and the data packet carrying the content to see whether the content is subscribed to at the servers. If the content is subscribed to, the content is saved at the servers along with the header information. Otherwise, the header is deleted and the content is cached. This header information, especially the indicator, is used by Web server 300 and Web server 302 to determine whether the content may be served or distributed to a requester without performing a more typical validity check. A typical validity check compares the current date and time to the Expires header of the page to see if it is still valid. The Expires header indicates when a page expires or becomes invalid. In making the check, the server also examines other cache control directives, such as, for example, must-revalidate, to see if it can serve out the page. The setting of a must-revalidate header requires the server or cache to contact the origin server to see if the cached content is still valid. A requesting client browser also may specify a desired max-age, max-stale, min-fresh times, and validity checks are performed against the cached content to see if the page adheres to the requirements of the client.

If the content is received by a server that is content distribution incapable, the indicator is ignored by the server. In this case, the server performs the normal validity checks.

Figure 4:
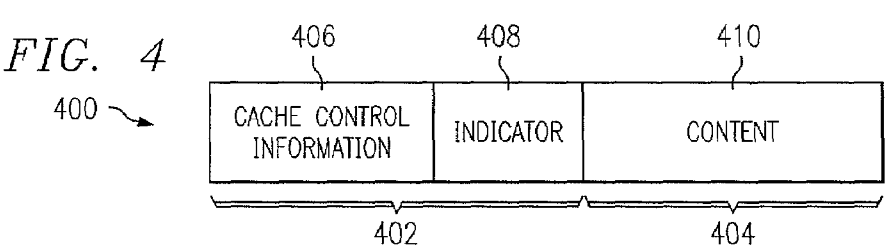
FIG. 4 is a diagram illustrating a data packet in accordance with a preferred embodiment of the present invention.

Turning next to FIG. 4, a diagram illustrating a data packet is depicted in accordance with a preferred embodiment of the present invention. Data packet 400 is an example of a data packet in which content control information has been included to identify the data within data packet 400 as being content distribution capable. Data packet 400 includes a header 402 and a payload 404. Header 402 includes cache control information 406 and indicator 408. In this example, indicator 408 identifies content 410 within payload 404 as being content distribution capable data. Cache control headers are used to specify how cache content is to be handled. For example, cache control headers may be specified as follows: cache control: max-age=<blah>, no-transform, must-revalidate i.e., as a sequence of directives, which can stand by themselves (must-revalidate) or associated with a value(max-age). In these examples, two directives or cache control headers are added. These two directives are CDIST_CDN=<value> and CDIST_FILENAME=<value>. The presence of these directives tell the cache that the origin server is a content distribution capable server. The directives also carry information that is valuable for use in maintaining state about URLs and the file names where they are stored. These examples are merely illustrative and not limiting to the types of headers or directives that may be used to inform a cache about content distribution capability.

Cache control information 406 in header 402 is, in these examples, standard cache control information to allow content distribution incapable caches to correctly handle content 410. Content distribution capable caches may choose to ignore most cache control information 406. Some cache control directives such as "no-store" have stringent semantics that prohibit a cache from ignoring them.

Figure 5:
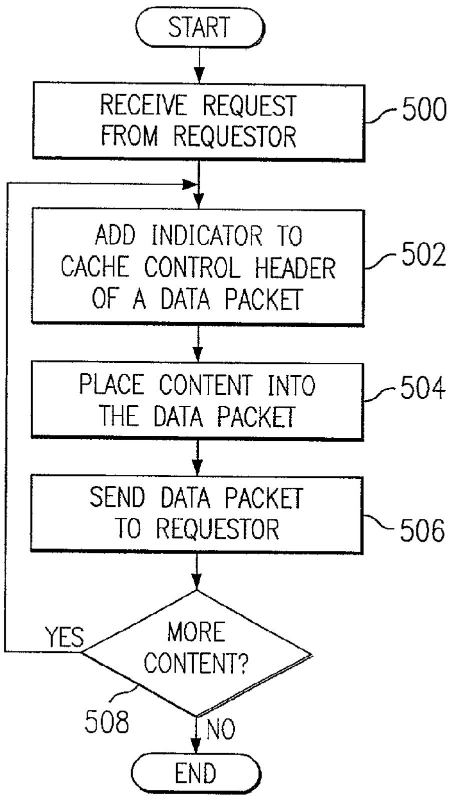
FIG. 5 is a flowchart of a process for receiving content from a content provider in accordance with a preferred embodiment of the present invention.

With reference now to FIG. 5, a flowchart of a process for receiving content from a content provider, is depicted in accordance with a preferred embodiment of the present invention. The process illustrated in FIG. 5 may be implemented in a content provider, such as originating Web server 304 in FIG. 3.

The process begins by receiving a request from the requestor (step 500). This request may be, for example, a request to pull content. An indicator is added to cache the control header of a data packet (step 502). This indicator may be, for example, indicator 408 in FIG. 4. The content is placed into the data packet (step 504). This content may be, for example, data for a Web page. The data packet is sent to the requester (step 506). Next, a determination is made as to whether there is more content to be sent (step 508).

In step 508, if no more content is present, the process terminates. With reference again to step 508, if a determination is made that there is more content, the process returns to step 502, as described above.

Figure 6:
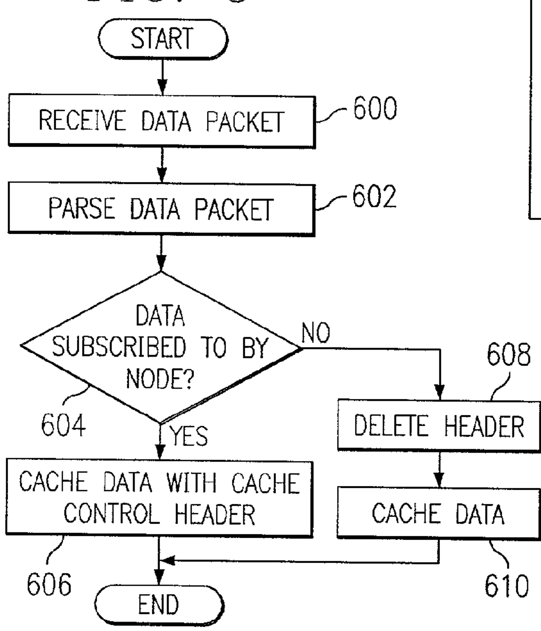
FIG. 6 is a flowchart of a process for receiving content in accordance with a preferred embodiment of the present invention.

Turning next to FIG. 6, a flowchart of a process for receiving content is depicted in accordance with a preferred embodiment of the present invention. The process illustrated in FIG. 6 may be implemented in a Web server, such as Web server 300 in FIG. 3 from a content provider, such as originating Web server 304 in FIG. 3.

The process begins by receiving a data packet (step 600). The data packet is parsed (step 602). Next, a determination is made as to whether the data is subscribed to by a node (step 604). If the data is subscribed to by a node, the data is cached with the cache control header (step 606) and the process terminates thereafter.

Turning again to step 604, if the data is not subscribed to by a node, the header is deleted (step 608). The data is cached (step 610) and the process terminates thereafter. With respect to data not subscribed to by a node, the following example provides a further explanation. Assume a company called foobar.com hosts both NFL and World Soccer news and scores. In this example, a cache is installed in Europe and subscribes to the SOCCER content group alone, containing URLs www.foobar.com/soccer/*. Now, it is possible that someone in Europe requests a page "www.foobar.com/nfl/headlines.html". If that page is not present in the cache, the cache will request the page from the origin server, cache the page, and deliver the page to the client. Even though the cache does not subscribe to that page, the page is placed into the cache via a request/response.

Figure 7:
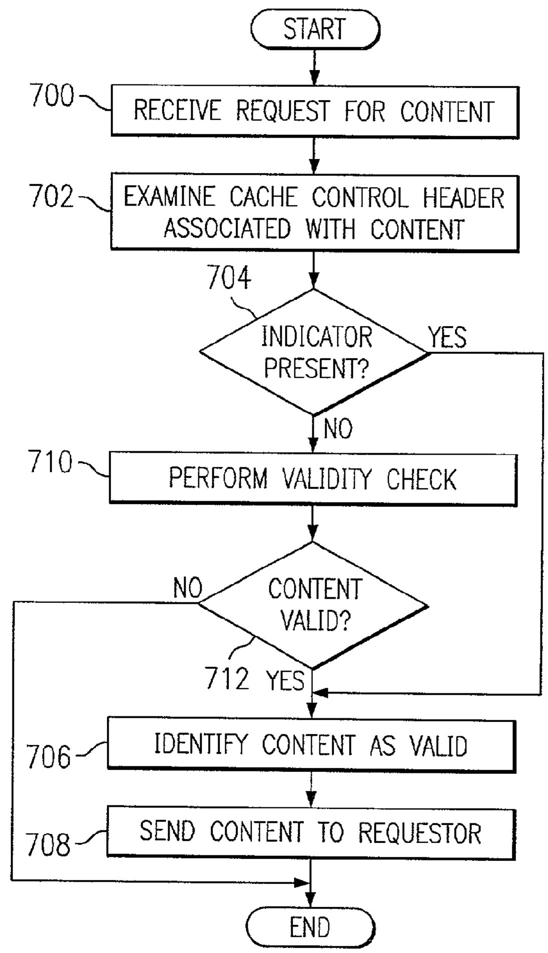
FIG. 7 is a flowchart of a process for handling a request for content at a node in accordance with a preferred embodiment of the present invention.

With reference now to FIG. 7, a flowchart of a process for handling a request for content at a node is depicted in accordance with a preferred embodiment of the present invention. The process illustrated in FIG. 7 may be implemented in a node, such as Web server 300 in FIG. 3.

The process begins by receiving a request for content (step 700). This request is received from a user at a client, such as a personal computer or a personal digital assistant. The cache control header associated with content is examined (step 702). The cache control header includes information from a header, such as header 402 in FIG. 4. Then, a determination is made as to whether an indicator is present (step 704). This indicator may be, for example, indicator 408 in FIG. 4. If an indicator is present, the content is identified as valid (step 706). The content is sent to the requester (step 708), with the process terminating thereafter.

Returning to step 704, if an indicator is not present, a validity check is performed (step 710). Next, a determination is made as to whether the content is valid (step 712). If the content is valid, the process returns to step 706, as described above. In step 712, if a determination is made that the content is not valid, the process terminates.

Thus, the present invention provides a method, apparatus, and computer implemented instructions for caching subscribed and non-subscribed content. Using the mechanism of the present invention, a content distribution capable cache which subscribes to a subset of content served from content distribution capable servers can cache at a higher efficiency for content subscribed to by the cache. The main efficiencies achieved using the mechanism of the present invention are due to the fact that the often incorrect Expires: header and the cache control directives are ignored. More often than not, Web administrators will not be able to specify when a document "expires". Typically, administrators are either conservative, setting a short expiration time, causing caches to not serve out perfectly valid content from their repository; or they are aggressive, setting a long expiration time, causing the caches to serve out stale content. The mechanism of the present invention allows caches to selectively ignore Expires headers and cache control directives, thus enhancing the number of pages that a cache can directly serve out to clients instead of having to proxy back to an origin server. Clients then see a better "hit rate", and a reduction in the average latency seen in responses from the cache. Additionally, the cache also may cache other content, thus functioning as a regular Web intermediary for such content. However, for non-subscribed or content distribution incapable content, the cache strictly enforces the cache-control headers.

Using the mechanism of the present invention, a content distribution-incapable cache will work just as before, following the semantics laid down by the cache-control headers. Further, the mechanism of the present invention minimizes the work required from an administrator of a Web server. With the mechanism of the present invention, the administrator is only required to add a new cache-control extension, indicating that the content is content distribution capable, to the configuration, so that the server tacks that on to all the responses. In this manner, the administrator may be assured that the caching will work correctly across all kinds of intermediaries. As added functionality, the administrator may partition the content into content distribution capable content and add that header only to those pages. This is a likely scenario because the administrator may not have the ability to issue update notifications for all types of content that the administrator may host.

The mechanism of the present invention also may be used in architectures in which intermediate nodes are chained, and each node is either content distribution capable or content distribution incapable. This mechanism works with this type of architecture because all caches pass the headers along to the requester in the chain.

Further, using the mechanism of the present invention, a cache will not ignore all cache-control extensions. For example, the cache may ignore time-based extensions, but may honor “no-cache” and “no-store”. The information ignored or used depends on the particular implementation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMS, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, the illustrated embodiments are described with respect to a pull system in which nodes pull content from a source. The mechanism of the present invention also may be used with a push system in which content is pushed from a source to the nodes. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for caching content, the method comprising:

receiving a plurality of data packets containing content and control information;

caching the content and control information of each data packet;

responsive to a request from a requestor for the particular content associated with a specified one of the plurality of data packets, determining whether a particular indicator is present with the particular content;

sending the particular content to the requester without performing a validity check, whenever the particular indicator is present with the particular content;

performing a validity check before sending the particular content to the requestor, only if the particular indicator is absent from the particular content; and said plurality of data packets are received at a node, and the particular indicator is present with the particular content only if the particular content is subscribed to at said node.

2. The method of claim 1, wherein the indicator identifies the content as being content distribution capable.

3. The method of claim 1 further comprising:

responsive to a determination that the particular indicator is absent, performing the validity check using the control information.

4. The method of claim 1, wherein the control information follows a hypertext transfer protocol.

5. A data processing system comprising:

a bus system;

a communications unit connected to the bus system;

a memory connected to the bus system, wherein the memory includes a set of instructions; and a processing unit connected to the bus system, wherein to processing unit executes the set of instructions to receive a plurality of data packets containing content and control information of each data packet; cache the content and control information of each data packet; determine whether a particular indicator is present with the particular content in response to a request from a requester for the particular content associated with a specified one of the plurality of data packets; send the particular content to the requester without performing a validity check whenever the particular indicator is present with the particular content; perform a validity check before sending the particular content to the requestor, only if the particular indicator is absent from the particular content; and receive said plurality of data packets at a node, and the particular indicator is present with the particular content only if the particular content is subscribed to at said node.

6. The data processing system of claim 5, wherein the content is a Web page.

7. The data processing system of claim 5, further comprising:

performing means, responsive to an absence of an enablement for content distribution, for performing a validity check on the content in response to a request for the content.

8. The data processing system of claim 5, wherein the data processing system is one of a cache for Web content or a proxy server.

9. The data processing system of claim 5, wherein an indicator in the packet is used for determining whether the content is enabled for content distribution.

10. The data processing system of claim 5, wherein the indicator is located in a header of the packet.

11. The data processing system of claim 5, wherein the packet is transmitted using a hypertext transfer protocol.

12. A data processing system for caching content, the data processing system comprising:

receiving means for receiving a plurality of data packets containing content and control information of each data packet;

caching means for caching the content and control information of each data packet;

determining means, responsive to a request from a requestor for the particular content associated with a specified one of the plurality of data packets, for determining whether a particular indicator is present with the particular content;

sending means, for sending the particular content to the requestor without performing a validity check whenever the particular indicator is present with the particular content;

validity checking means, for performing a validity check before sending the particular content to the requestor, only if the particular indicator is absent from the particular content; and said receiving means receives said plurality of data packets at a node, and the particular indicator is present with the particular content only if the particular content is subscribed to at said node.

13. The data processing system of claim 12, wherein the indicator identifies the content as being content distribution capable.

14. The data processing system of claim 12 further comprising:

performing means, responsive to a determination that the particular indicator is absent, for performing the validity check using the control information.

15. The data processing system of claim 12, wherein the content is one of a Web page, an audio file, a text file, a program, or a video file.

16. The data processing system of claim 12, wherein the control information follows a hypertext transfer protocol.

17. A computer program product in a data processing system for caching content, the computer program product comprising:

first instructions for receiving a plurality of data packets containing content and control information;

second instructions for caching the content and control information of each data packet;

third instructions, responsive to a request from a requestor for the particular content associated with a specified one of the plurality of packets, for determining whether a particular indicator is present with the particular content;

fourth instructions, for sending the particular content to the requestor without performing a validity check whenever the particular indicator is present with the particular content;

fifth instructions, for performing a validity check before sending the particular content to the requestor, only if the particular indicator is absent from the particular content; and sixth instructions for receiving said plurality of data packets at a node, the particular indicator being present with the particular content only if the particular content is subscribed to at said node.

* * * * *

UNITED STATES PATENT AND TRADEMARK OFFICE

CERTIFICATE OF CORRECTION

PATENT NO. : 7,028,089 B2
APPLICATION NO. : 09/960448
DATED : April 11, 2006
INVENTOR(S) : Agarwalla et al.

It is certified that error appears in the above-identified patent and that said Letters Patent is hereby corrected as shown below:

Col. 9, line 58: after "to the" delete "requester" and insert --requestor--.

Col. 10, line 14: after "wherein" delete "to" and insert --the--.

Col. 10, line 21: before "for the" delete "requester" and insert --requestor--.

Col. 10, line 23: after "to the" delete "requester" and insert --requestor--.

Signed and Sealed this

Twenty-fourth Day of October, 2006

JON W. DUDAS
*Director of the United States Patent and Trademark Office*